United States Patent
Dahlberg (10) Patent No.: US 7,694,613 B2
(45) Date of Patent: Apr. 13, 2010

(54) TOOL DEVICE FOR HIGH-SPEED MACHINE-WORKING

(75) Inventor: Anders Dahlberg, Göteborg (SE)

(73) Assignee: Morphic Technologies Aktiebolag (publ), Karlskoga (SE)

( * ) Notice: Subject to any disclaimer, the term of this patent is extended or adjusted under 35 U.S.C. 154(b) by 588 days.

(21) Appl. No.: 10/510,124

(22) PCT Filed: Mar. 12, 2003

(86) PCT No.: PCT/SE03/00406

§ 371 (c)(1),
(2), (4) Date: Oct. 4, 2004

(87) PCT Pub. No.: WO03/086690

PCT Pub. Date: Oct. 23, 2003

(65) Prior Publication Data

US 2006/0032353 A1 Feb. 16, 2006

(30) Foreign Application Priority Data

Apr. 8, 2002 (SE) .................................. 0201064

(51) Int. Cl.
*B26D 3/16* (2006.01)
*B26D 5/08* (2006.01)

(52) U.S. Cl. ............................. 83/198; 83/580; 83/590; 83/699.41

(58) Field of Classification Search ................ 83/198, 83/54, 188–197, 580, 586–588, 590, 639.1, 83/694, 698.71, 699.31, 699.41
See application file for complete search history.

(56) References Cited

U.S. PATENT DOCUMENTS

| 1,318,249 | A | * | 10/1919 | Winters | 83/198 |
| 3,391,591 | A | * | 7/1968 | Funke | 83/197 |
| 3,735,656 | A | | 5/1973 | Strandell et al. | 83/198 |
| 3,956,953 | A | * | 5/1976 | Lindell | 83/188 |
| 3,972,257 | A | * | 8/1976 | Lazar, Jr. | 83/198 |
| 4,470,330 | A | | 9/1984 | Lindell | 83/82 |
| 4,526,073 | A | * | 7/1985 | Elhaus | 83/15 |
| 4,635,514 | A | * | 1/1987 | Borzym | 83/196 |

OTHER PUBLICATIONS

International Search Report.
International Preliminary Examination Report.

* cited by examiner

*Primary Examiner*—Clark F. Dexter
(74) *Attorney, Agent, or Firm*—Pillsbury Winthrop Shaw Pittman, LLP (57) ABSTRACT

The present invention relates to a tool device for high-speed crosscutting, comprising a striking unit, a tool housing, a damper unit, a movable crosscutting tool and a fixed crosscutting tool. The tool housing has at least two curved supporting surfaces for the moveable crosscutting tool. The supporting surfaces have the same radius. A recess is provided between the supporting surfaces. The recess is provided for a striking piston in the striking unit. Also provided is a crosscutting tool for high-speed machine-working.

6 Claims, 10 Drawing Sheets

TOOL DEVICE FOR HIGH-SPEED MACHINE-WORKING

TECHNICAL FIELD

The invention relates to a tool device for high-speed crosscutting, comprising a striking unit, a tool housing, a damper unit, a movable crosscutting tool and a fixed crosscutting tool. The invention also relates to a crosscutting tool for high-speed machine-working.

PRIOR ART

By virtue of, for example, U.S. Pat. No. 3,735,656, a tool device of the above description is previously known. The use of such a tool device to cut rod-like material by virtue of high energy-supply speed is therefore previously known. Despite a number of potential advantages with the method, it is not widespread and established within manufacturing industry. One of the reasons why this technique has not become established on a larger scale appears to be that the tool configuration was deficient and led to undesirable production stoppages. Just such a deficiency is that it was often not possible to obtain sufficiently good precision in terms of the alignment of the fixed and the movable tool. Common to conventional tool configurations is that the crosscutting tools, at least the movable crosscutting tool, was rectangular. For production engineering reasons, there has to be a certain clearance between the sides of the tools and the tool housing, both in the lateral direction and in the vertical direction. The measuring accuracy in respect of the centre hole for the material relative to the sides of the tool also demands a certain tolerance. All in all, this means that the position of the centre hole for the two tools is not certain to be exactly mutually aligned, which poses a problem when material is to be fed through the tool between each cut. Another deficiency is that known constructions used a type of helmet for transmitting the impact energy from the striking piston to the movable crosscutting tool, which is an undesirable construction from many aspects. Another drawback is that known constructions require removal of the tool housing in case of tool change and thereby gave undesirably long set-up times for the machine.

SUMMARY OF THE INVENTION

An object of the present invention is to eliminate or at least minimise some of the aforementioned problems, which is achieved with a tool device for high-speed crosscutting, comprising a striking unit, a tool housing, a damper unit, a movable crosscutting tool and a fixed crosscutting tool, characterised in that the tool housing has at least two curved supporting surfaces for the movable crosscutting tool, which supporting surfaces have the same radius, and in that between the said supporting surfaces there is a recess for a striking piston belonging to the striking unit.

Owing to the invention, very good precision in terms of alignment of the fixed and movable tool is achieved. In addition, the configuration means that simpler methods in production-engineering terms can be used to obtain high measuring accuracy. The invention further means that the tools can automatically be centred in the lateral direction, also, when they are applied to the tool housing in the vertical direction, which is a great advantage.

According to preferred aspects of the invention, it is possible to make the tool housing so strong that the conventionally used "helmet" can be eliminated, so that the striking piston can strike directly against the movable crosscutting tool. According to another aspect, it means that the fixed tool is pressed against one side inside the recess in the tool housing so that a mute response is obtained upon the blow, which aspect is further improved by the fact that the tool housing is of elongated configuration in the direction of impact, and without undesirable kerfs, which were often the case in previously known constructions. Another potential advantage is that the tool housing can be configured such as to enable a very compact unit for tool return and damping of surplus energy to be placed in direct connection with the movable crosscutting tool, whereby a constantly pressurised return piston can be brought to act directly against the movable crosscutting tool so that the time between the blows can be made extremely short.

BRIEF DESCRIPTION OF THE FIGURES

The invention will be described in greater detail below with reference to figures of a preferred illustrative embodiment, in which.

DETAILED DESCRIPTION

Figure 1:
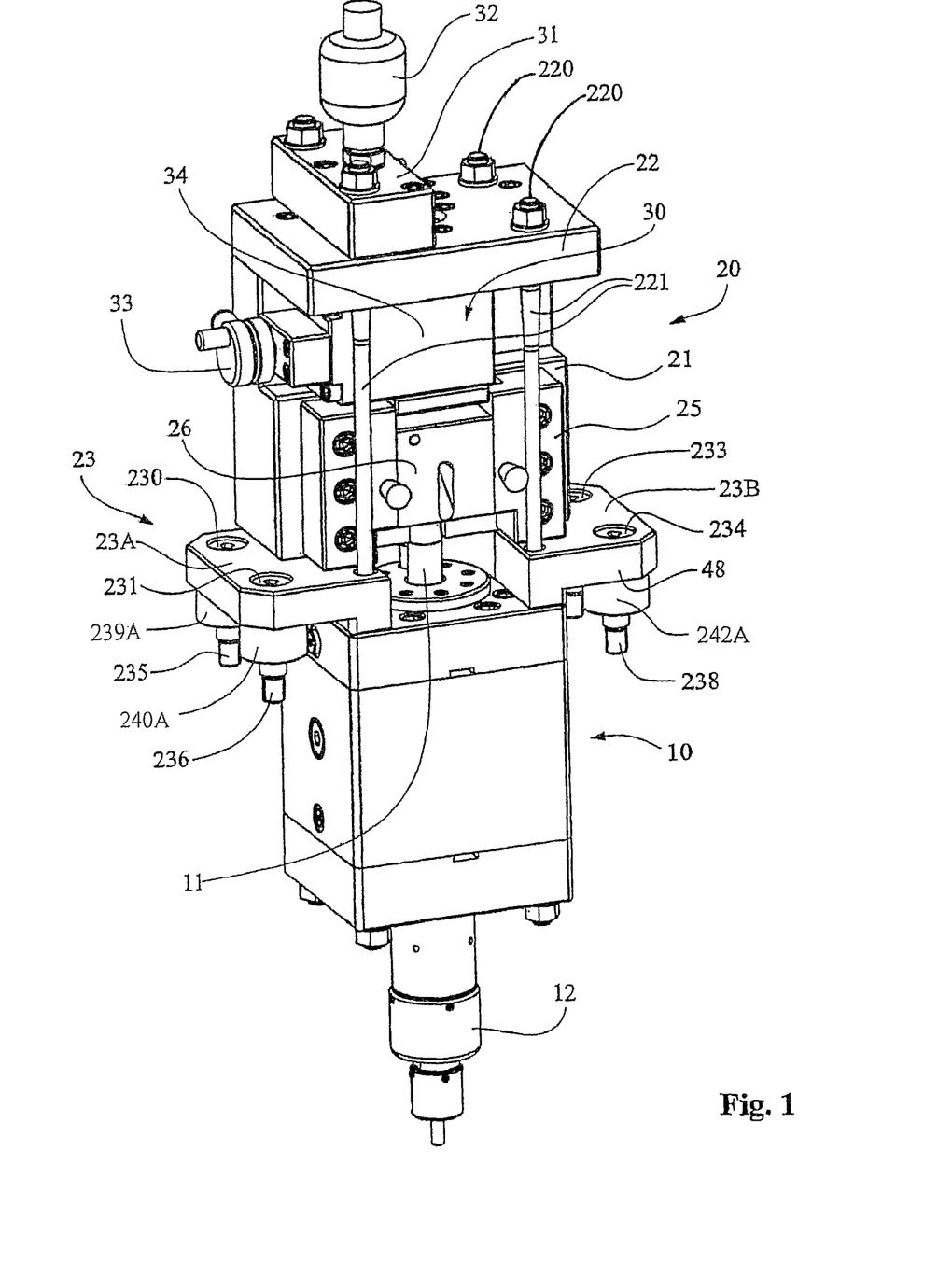
FIG. 1 shows a perspective view obliquely from above of a preferred module unit of a tool device according to the invention.

FIG. 1 shows in perspective view obliquely from above a preferred module unit of a tool device according to the invention. The tool device comprises a striking unit 10, a tool housing 20 and a damper 30. Inside the tool housing 20 there are disposed a movable crosscutting tool 40 and a fixed crosscutting tool 50. A striking piston 11, which is supported and driven by a driving portion of the striking unit 10, can administer to the movable crosscutting tool 40 from below an upwardly directed blow with high kinetic energy, in a manner which is known per se, the fixed crosscutting tool 50 exerting a detaining force upon the workpiece to be cut (not shown). The damper 30 is arranged to brake the striking motion of the movable crosscutting tool 40 following completion of the cutting. The striking unit 10 and the damper 30, with associated damper housing 34, hydraulic block 31 and pressure accumulator 32, do not form part of this invention and will therefore not be described in depth. It can however be mentioned that the projecting wheeled member 33 on the damper 30 constitutes an adjusting mechanism for setting the desired damping, as well as that the cylindrical portion 12 projecting downward in the figure on the cylinder housing 10 constitutes a position indicator housing.

Figure 2:
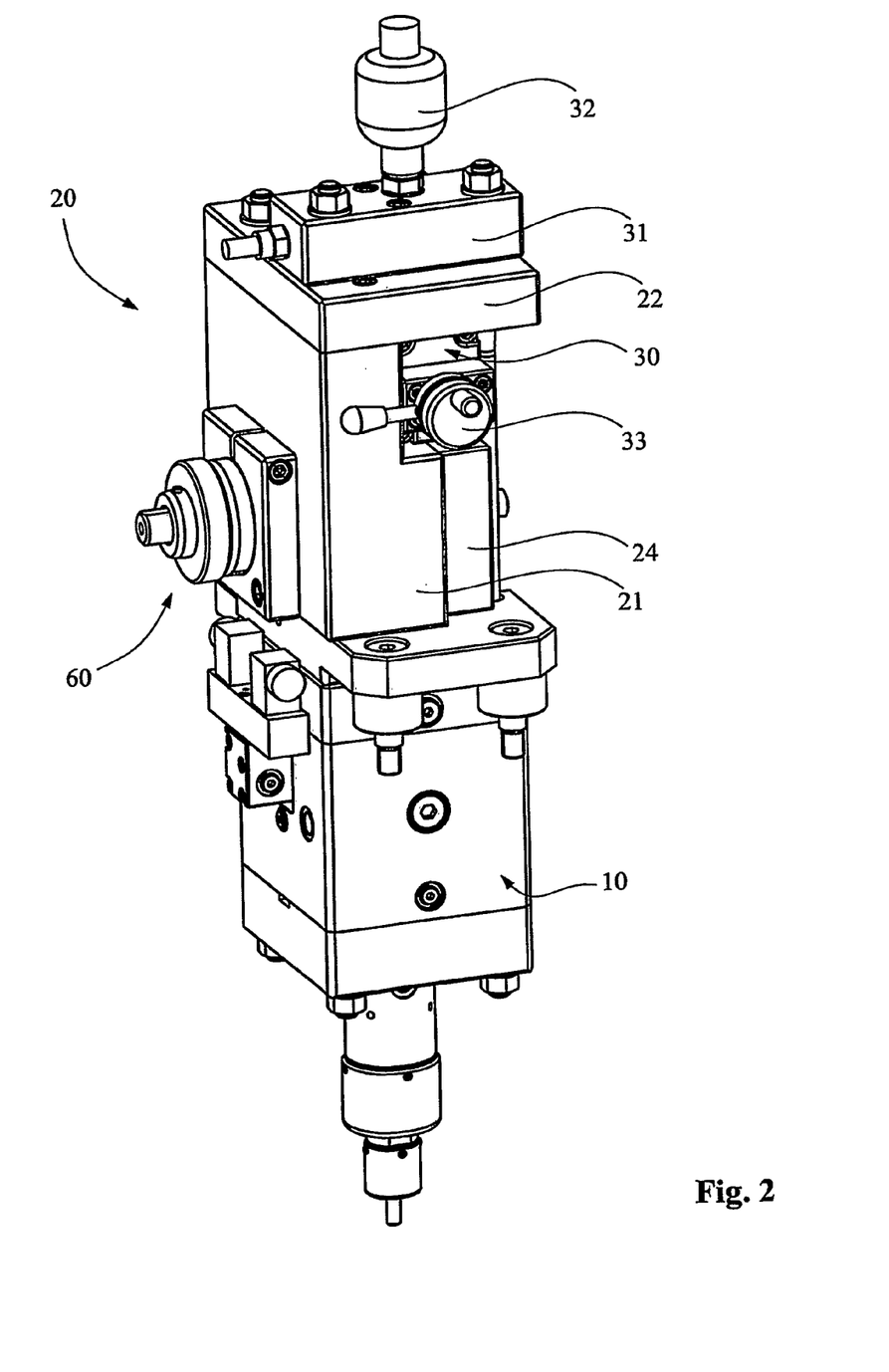
FIG. 2 shows the same device in a perspective view from another direction.

According to the illustrative embodiment shown, the tool module shown in FIG. 1 and FIG. 2 is arranged to cut cylindrical wire. For the purpose of guiding the wire which is to be cut, there is a wire-guiding unit 60, which is centrally placed on the back of the tool housing 20 (see FIG. 2). The tool housing 20 consists of a solid base element 21 on top of which there is a cover 22. The cover 22 is firstly fixed to the base unit 21 by means of screws 220 at its rear edge and secondly by means of stud bolts 221 at its front edge. These stud bolts also hold together other parts of the module, i.e. also the striking unit 10 and a base plate 23 belonging to the tool housing. The base plate 23 comprises a suspension arrangement 23, which enables quick and simple fitting and removal of the entire tool module.

The suspension arrangement on the said base plate 23, is solid and has a width exceeding the width of the actual tool housing 20. Projecting portions 23A, 23B are thus formed, on both sides of the tool housing 20. In each of these projecting portions 23A, 23B there are two holes 230, 231 and 233, 234 respectively, in which fitting bolts 235-238 are disposed. On these fitting bolts there are rubber pads 239A-242A. The fitting bolts 235-238 are designed to be fitted into matching holes in the actual crosscutting machine (not shown), whereby the tool device is fixed in the horizontal plane in the machine. Owing to the rubber pads, a certain resilience is allowed in the vertical direction, giving both sound insulation and vibration damping. Thanks to the solution involving fitting bolts, the facility is obtained for very fast and smooth changing of the entire module unit, whereby costly stoppages can be eliminated. In known devices, the entire unit cannot be changed, according to requirement, without the need for a time-consuming removal of various component parts.

Figure 3:
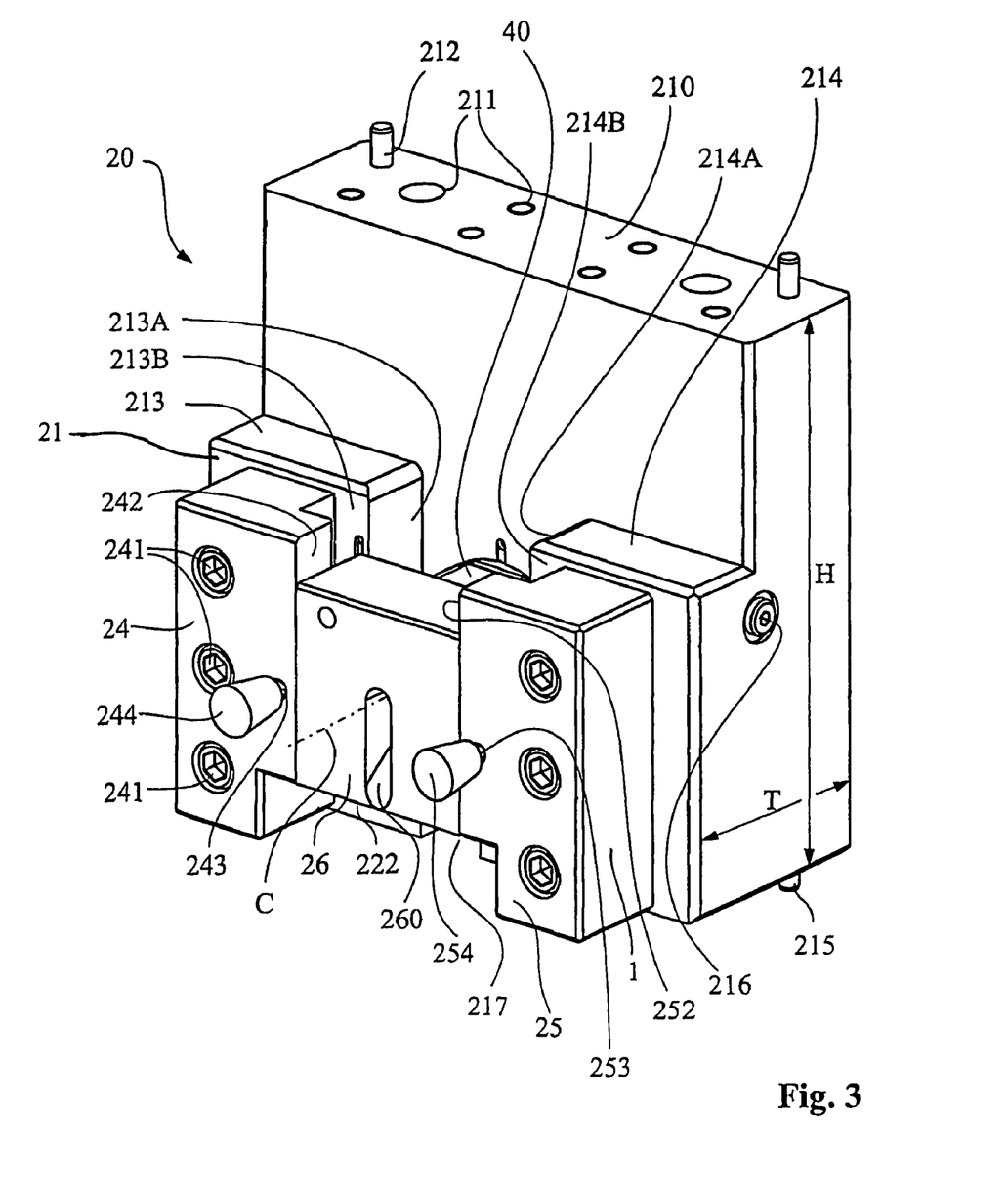
FIG. 3 shows in perspective obliquely from above a preferred embodiment of a tool housing belonging to the device.

FIG. 3 shows essential parts of a preferred embodiment of certain essential parts of a tool housing 20 according to the invention. It can be seen that the base element 21 consists of a solid piece of relatively, large height H and also of relatively large thickness T. Up on its end face 210 there are threaded holes 211 for fastening of the cover 22. In addition there are guide pins 212 arranged for exact positioning of the cover 22. On the front face of the base element there are arranged two heel-shaped portions 213 and 214, so that on each inwardly directed end face 213A and 214A there are formed parallel guide surfaces, which normally are positioned vertically, so that these guide surfaces 213a, 214a can prevent rotation of the movable crosscutting tool 40. To each of the heels 213 and 214 there is fastened a respective fixing member 24 and 25. These fixing appliances 24, 25, like the heels 213, 214, are configured wholly symmetrically with respect to a vertical plane of symmetry coinciding with the centre line C for the wire which is to be cut. Each fixing appliance 24, 25 is fixedly anchored to the respective heel 213 by means of three screws 241. The fixing appliance 24 has its lower surface level with the base unit 21 and extends right up to somewhat directly below the respective upper end face of the heels 213, 214. From an essentially rectangular main body part in the fixing appliance 24, supporting portions 242 and 252 project in toward the centre line C. Parallel with the centre line C, in each of the said supporting portions 242, 252, there are recesses 243 and 253. In the said recesses 243, 253, resilient locking appliances 244 and 254 respectively are disposed (see FIG. 8). With the aid of these locking appliances 244, 254, a supporting hatch 26 is fixed in the vertical direction. In the lateral direction and outward/forward, the hatch 26 is fixed by the respective fixing appliance 24, 25 and held inwardly in place by means of outwardly directed surfaces 213B, 214B of the heel members 213, 214. In the centre of the supporting hatch 26 there is a recess 260 (shown previously in FIG. 5). In the bottom of the base element 21 are disposed guide pins 215 designed to fix the base element 21 in the bottom plate 23 to the tool device. In addition, FIG. 3 shows that on one face of the base element 21 there is a lubricating hole 216, for lubricating slide surfaces in the crosscutting device. Finally, in FIG. 3, a recess 217 is discernible in the bottom portion of the base unit 21, which recess 217 has a U shape and provides space for the striking piston 11 to penetrate up toward the movable crosscutting tool 40.

Figure 4:
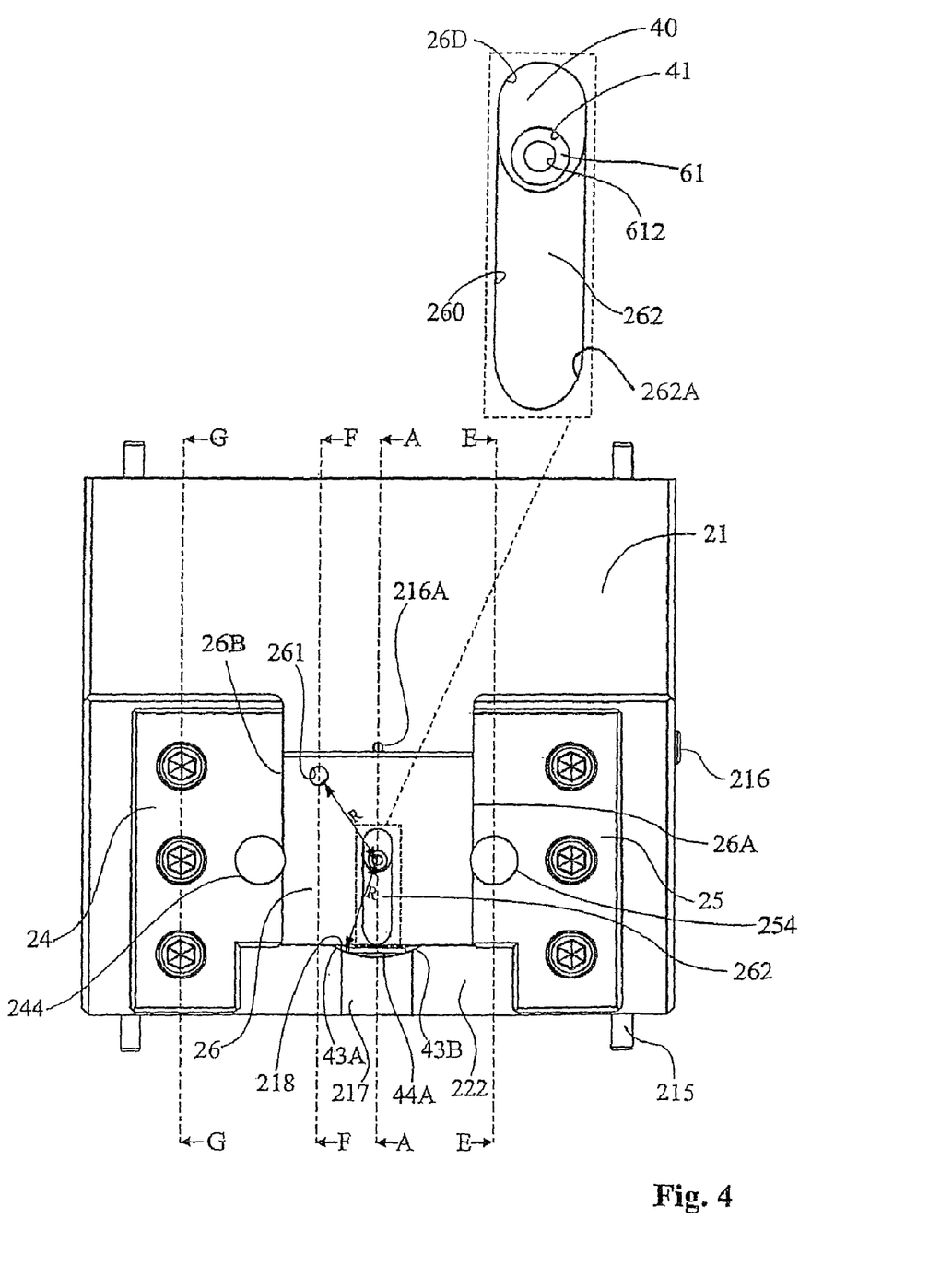
FIG. 4 shows the same unit as FIG. 3 but directly from the front.

FIG. 4 shows a front view of the unit according to FIG. 3. It can be seen that the hatch at the ends of the front face is provided with edge portions 26A, 26B, which interact, with fit, with opposite-facing side faces of the supporting portions 242, 252. Unlocking of the locking appliances 244, 254 allows displacement of the hatch 26 in the vertical direction, i.e. parallel with the guide surfaces 26B, 26A. It can further be seen that the recess 260 disposed in the central part of the hatch 26 has an upper portion 26D which extends through the whole of the hatch 26. Downward in the direction out toward the front face from the said through-hole there is a downwardly directed recess 262, whereby a sloping bottom portion 262A is formed. In the extension of the through-hole 26, concentrically positioned, there is a through-hole 41, in the movable crosscutting tool 40, and behind this a through-hole 612 in a guide sleeve 61 (see FIG. 5). Emerging above the upper edge of the hatch 26 there is an opening 216A of the lubricating duct 216, so that lubricant can flow down toward purpose-made slide surfaces. In extension of the recess 217 for the striking piston 11, the bottom edge 44A of the movable crosscutting tool 40 is discernible. It is evident that the bottom edge forms a plane edge face 42, which is designed to receive the blow from the piston 11. It can further be seen that adjoining edge faces 43a, 43b constitute curved surfaces. These curved surfaces are configured with a given radius R. The same radius R is found in the surface 218, present in the base element 21, which is borne against by the radius-possessing lower surfaces of the crosscutting tools.

Figure 5:
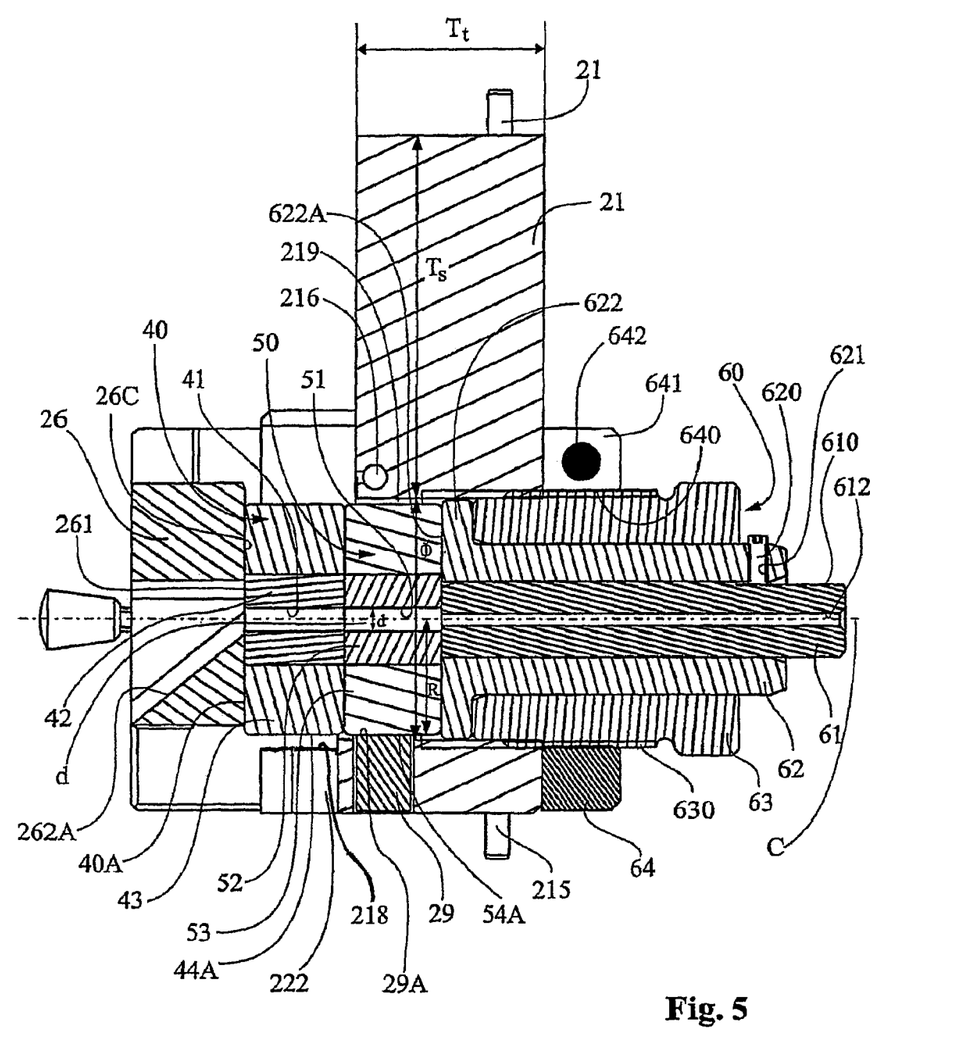
FIG. 5 shows the section A-A according to FIG. 4.

FIG. 5 shows a section along the line A-A in FIG. 4. It can be seen that the control unit 60 comprises an inner guide sleeve 61, which is centred in relation to the centre line C for the wire which is to be cut. The guide sleeve 61 is, in turn, fixed inside a tensioning sleeve 62, concentrically. For the purpose of being able to fix the guide sleeve 61 inside the tensioning sleeve 62, the guide sleeve 61 is provided with a beveled surface 610, designed to interact with a stop screw 620 which, threaded, is disposed in a hole 621 at the end of the tensioning sleeve 62. At the other end of the tensioning sleeve 62 there is a flange-like portion 622, which is wholly matched to the configuration of the hole 219 present in the base element 21. This hole is wholly cylindrical, with a certain radius R. Corresponding to this radius R is the radius R found in the curved edge portions, for example 43A, 43B of the striking tools 40, 50 (to be described in greater detail below).

The flanged portion 622 of the tensioning sleeve 62 has a diameter which is essentially consistent with the diameter inside the hole 219 through the base element 21. For positioning of the tensioning sleeve and the flange 622, and hence the positioning surface 622A of the flange, a pressure screw 63 is provided, which is sleeve-shaped and is arranged concentrically on the outside of the tensioning sleeve 62. In the outer surface of the pressure screw 63 there is a thread 630. This thread 630 is designed to interact with a lock block 64 and a correspondingly threaded through-hole 640 in the lock block 64. The lock block 64 is fixed to the base element 21 by fixing screws (see FIG. 8). By providing the lock block 64 with a through-slot 641 and a threaded joint 642 interacting therewith, it is possible to adjust the clamping force from the thread 640 against the pressure screw 63 to the required level, from being able to run very easily to being able to fix the pressure screw 63 by clamping/friction force. By threading the pressure screw 63 to the desired position, the desired positioning of the guide surface 622A of the tensioning sleeve 62 is therefore obtained. At the same time, an exact centring of the centre line C through the hole 612 in the guide sleeve is obtained by the construction (it will be realised that normally the diameter of the through-hole 612 is chosen to be larger than the holes 41, 51 in the crosscutting tools 40, 50).

It can further be seen from FIG. 5 that the fixed crosscutting tool 50 consists of two concentrically arranged sleeve-shaped parts 52, 53. The inner sleeve is made in a material (expediently hard metal or hardened high-speed steel), the properties of which, above all, are optimised with respect to wearing properties. The outer sleeve 53 is chosen in a material which primarily is optimised with regard to being able to absorb large instantaneous force shocks without risk of plastic deformation or cracking (for example, tool steel with high impact strength). Correspondingly, the movable tool 40 is also composed of an inner 42 and an outer 43 sleeve-shaped part. Through the inner sleeve-shaped element 42 and 52, holes 41 and 51 respectively are made, the diameter d of which is somewhat larger than the wire diameter $d_T$ of the wire which is to be cut. The clearance should in many applications be kept to about 0.03-0.05 mm, but very often there is a need for greater clearance in case of increasing diameter $d_T$. Other configurations of the crosscutting tools are described in greater detail in connection with FIG. 10 and FIG. 11.

The fixed crosscutting tool 50 thus bears with its inner surface against the guide surface 622A of the tensioning sleeve 62. The fixed tool 50 is positioned inside the cavity 219 in the base element 21 so that it is both rotationally secure and also, moreover, in the transverse direction fixed in relation to the base element 21. Since the tool 50 is provided with four curved edge faces 53A, 53B, 53C, 53D which are exactly matched to the radius R of the through-hole 219, an exact positioning and alignment of the tool will be obtained. The centre line C for the wire will therefore coincide with the centre line for the tool 50. Correspondingly, an identical positioning of the movable tool 40 is achieved by virtue of the latter, with its lower, radius-possessing surfaces 43A, 43B interacting with/bearing against the radius-possessing surface 218 of the part 222 of the base element which projects forward at the bottom and in which the U-shaped opening for the striking piston 11 is disposed. It can be seen from FIG. 5 that the opposite-facing surfaces of the movable 40 and the fixed 50 tool are designed to slide relative to each other, which must occur in connection with cutting of a wire which has penetrated into the through-hole 41 of the movable tool 40. At the same time, a guidance takes place of the movable tool 40 on its opposite side 40A, by means of an inwardly directed surface 26C of the hatch 26. For the purpose of being able to prevent rotation of the fixed tool 50, a rotation lock 29 is provided, consisting of a rod-shaped member whose upper surface 29A is designed to interact with a plane surface 54A of the fixed tool 50.

Figure 6:
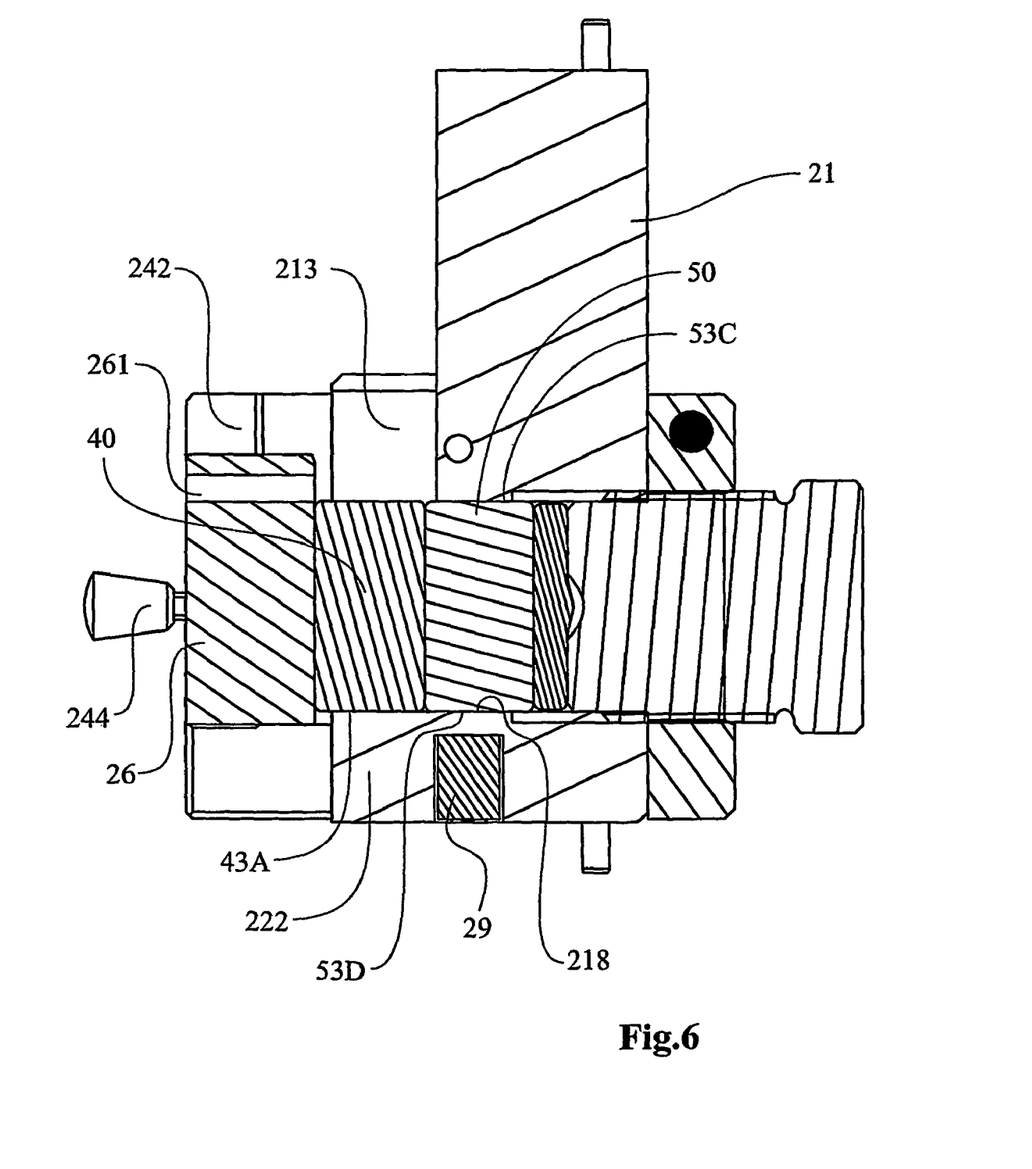
FIG. 6 shows the section F-F in FIG. 4.

FIG. 6 shows a section along the line F-F in FIG. 4. It can here clearly be seen that the edge portions 53C, 53D in the section for the fixed tool 50 have exactly the same fit as the circular surface 218 of the through-hole 219 in the base element 21. It can also be seen that the movable tool 40 in the same way interacts with one of its radius-possessing surfaces 43a in the same section and against a surface 218 with the same radius R, so that an exact positioning/alignment is obtained. In the figure, it can also be seen that an inspection hole 261 is provided through the hatch 26.

Figure 7:
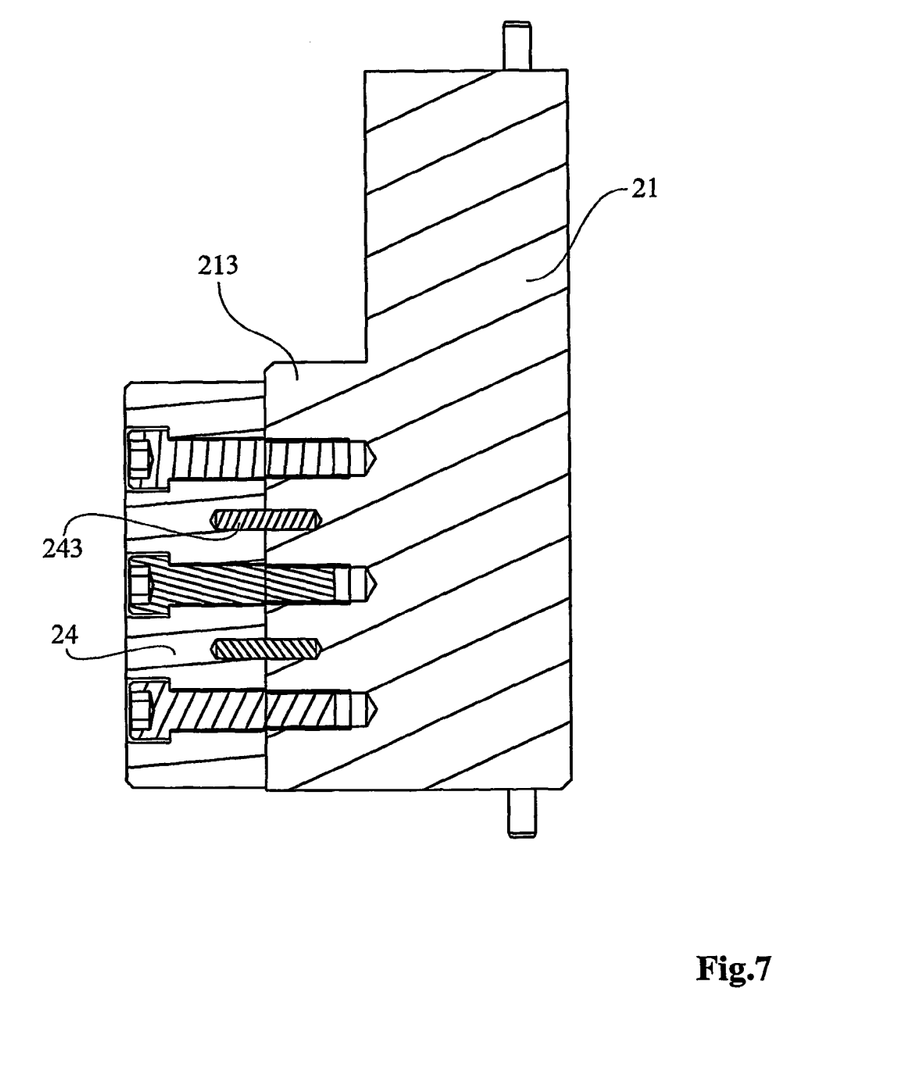
FIG. 7 shows the section G-G in FIG. 4.

FIG. 7 shows a section along the line G-G in FIG. 4. It can be seen that the fixing appliance 24, in addition to the screw elements 241, is also fixed by guide pins 243. It can further be seen that the heel 213, according to a preferred embodiment, constitutes a part integrated with the base elements 21.

Figure 8:
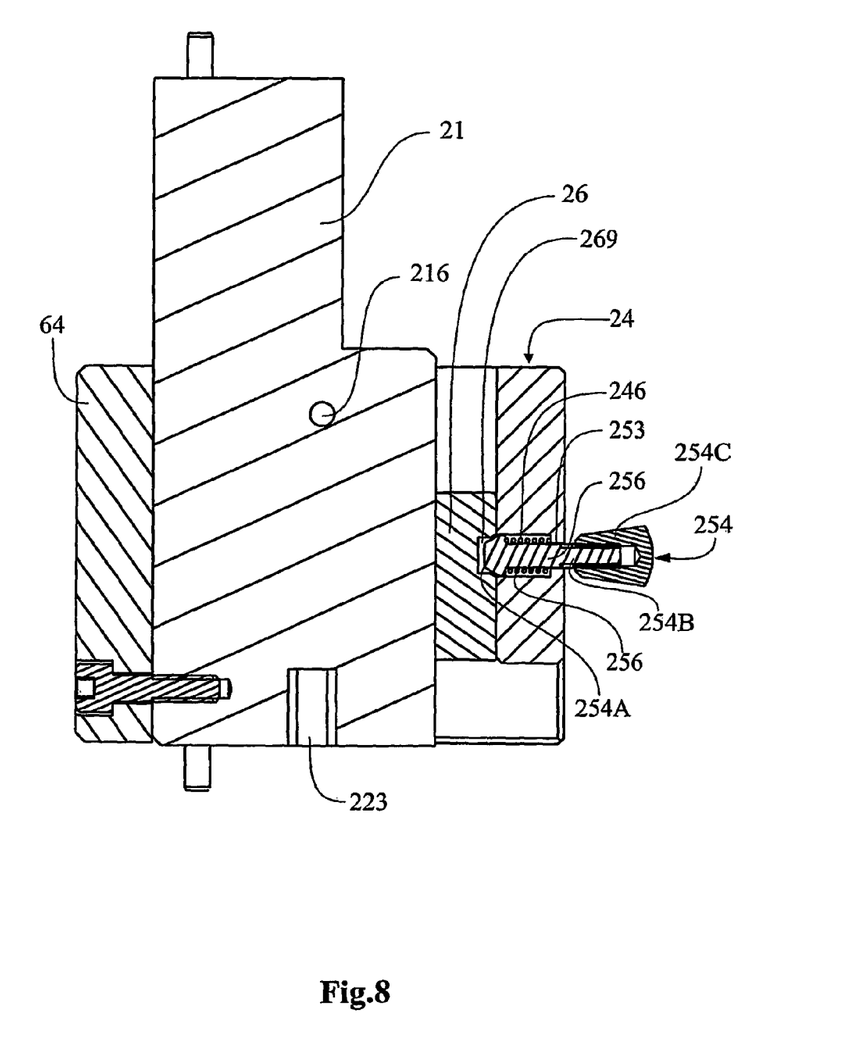
FIG. 8 shows the section E-E in FIG. 4.

FIG. 8 shows a section along the line E-E in FIG. 4. It can herein be seen that the hatch 26 is configured with a non-continuous recess 269, designed to interact with the end 254A of a lock appliance 254. This consists, in turn, of a pin-shaped element 254B, which, at its other end, has been provided with a knob 254C. A spring element 256 is disposed in an inner cavity 246 in the fixing appliance 24, the end 254A of the lock appliance endeavouring to jut out of the cavity 246, whereby the hatch 26 can easily be fixed in the vertical direction by snapping in place. Also shown is a threaded hole 223, designed for fastening of the base element 21 against the bottom plate 23.

Figure 9:
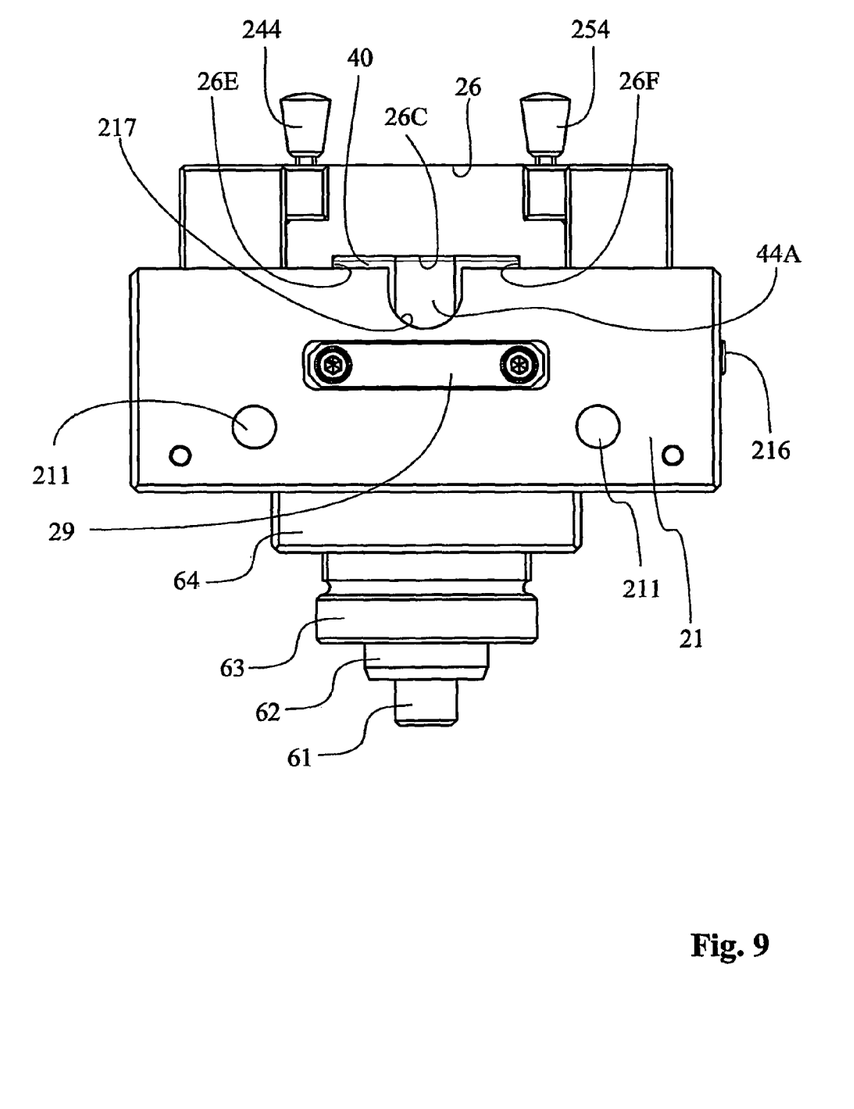
FIG. 9 shows a view from below of the unit according to FIG. 3.

FIG. 9 shows a view from below of the element according to FIG. 4. It can be seen that the hatch 26 has a cross-sectional form in the horizontal plane which generates the guide surfaces 26E, 26F for the movable crosscutting tool 40 in the lateral direction. Also evident are the U-shaped recess 217 in the base element 21 and the recess 211 for the through-passing stud bolts.

Figure 10:
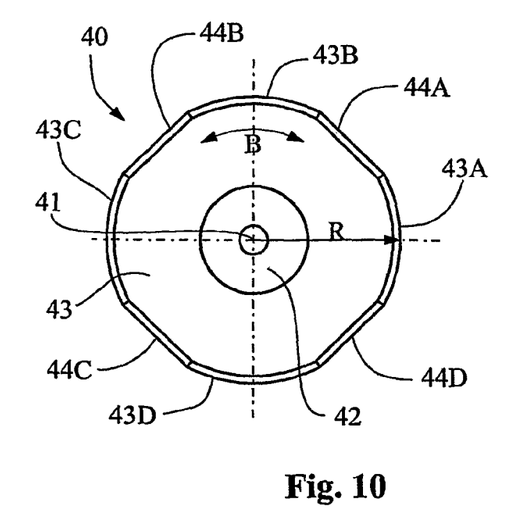
FIG. 10 shows a movable crosscutting tool according to a preferred embodiment according to the invention viewed from the front.

FIG. 10 shows a front view of a movable crosscutting tool according to a preferred embodiment of the invention. The crosscutting tool 40 consists of an inner annular body 42, through which there is a through-hole 41, which is centrally placed. Outside the inner annular body 42 there is additionally disposed an annular, concentrically arranged body 43. The tool 40 is symmetrical with regard to a plurality of dividing planes which intersect the centre line for the through-hole 41. The body thus consists of a plurality of uniform sectors, in the case shown four uniform quadrants. Each such quadrant comprises a curved surface 43A-43D with a radius R corresponding to the distance from the centre axis of the mid-hole to the periphery of the edge. Moreover, each quadrant also contains an edge portion 44A with a plane surface. A great advantage with the shape of the crosscutting tool 40 is that the curved surfaces 43A-43D can be made with very high precision using conventional, cost-effective machine-working, for example turning. Since these curved surfaces 43A-43D are used for positioning/alignment of the crosscutting tool 40 in the tool housing 20, this means that very high precision with respect to alignment, i.e. the arrangement of the through-hole 41 along a predetermined axis C through the tool, can easily be obtained. The plane surfaces 44A of the crosscutting tool 40 are used to be able to take the blow from the striking piston 11 and also, on the opposite side 44C, for braking the motion of the crosscutting tool 40, toward the damper unit 30, after the blow has been executed. As can be seen from FIG. 10, sharp edges of the tool 40 are eliminated by virtue of their beveling.

Figure 11:
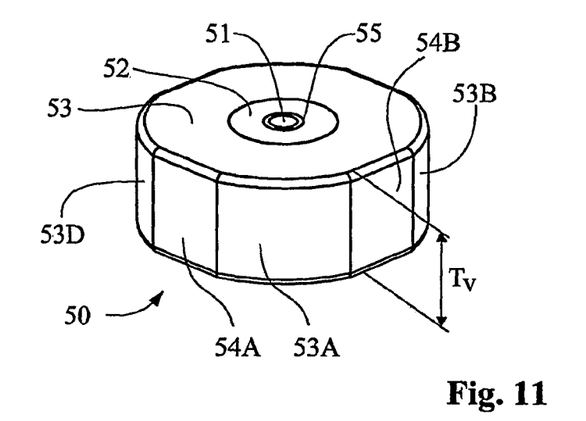
FIG. 11 shows a fixed crosscutting tool according to a preferred embodiment according to the invention, viewed in perspective.

FIG. 11 shows a fixed crosscutting tool 50 viewed in perspective. It can be seen that the fixed crosscutting tool 50, according to a preferred embodiment, has exactly the same outer configuration as the movable crosscutting tool 40, which is rational from many aspects and, inter alia, reduces the production costs. Thus the fixed crosscutting tool also has four curved surfaces 53A-53D and four plane surfaces 54A-54D. Moreover, the fixed tool also consists of an inner 52 and outer 53 annular body. In the inner hollow body 52 there is a through-hole 51 similar to that in the movable body 40. Unlike the movable tool body 40, the fixed crosscutting tool, however, can be provided on one side with a beveled edge portion 55 around the opening for the inner hole 51. This makes it easier to feed a new wire in through the guide sleeve 61 and onward through the hole 51 in the fixed tool, since normally the through-hole 612 of the guide sleeve is somewhat larger than the hole 51 in the fixed tool 50.

When the tool is in use, the parts are assembled as shown in FIGS. 1 and 2. Moreover, as previously described, the entire module unit 10, 20, 30, 40 and 50 is fixed in a crosscutting machine (not shown) by the fitting bolts 236-239. With the aid of a specially adapted feed device, a rod-shaped material (not shown) is then fed in through the cavity 612 in the guide sleeve 61 and then further in through the hole 51 in the fixed crosscutting tool 50 and finally also through the hole 41 in the movable crosscutting tool 40. The crosscutting machine is then ready to be started, which means that the driving portion of the striking unit 10 causes the piston 11 to accelerate upward so as finally to hit the stop face 44A of the movable tool 40 with high energy velocity. The movable crosscutting tool 40 is then accelerated upward away from the striking piston 11 and strikes with high energy with its inner edge in the parting plane between the movable 40 and the fixed 50 tool, whereupon a sufficiently large energy shock is transmitted by the rod-shaped material to produce an adiabatic cutting. Next the crosscutting tool 40 is damped by the damper unit 30, as a result of the upper plane surface 44C of the tool bearing against a movable unit (not shown) belonging to the damper 30 so that the striking motion is retarded, after which the crosscutting tool is returned to the striking position as a result of the tool being pressed constantly downward, by the said movable unit in the damper, toward the striking position. Owing to the guide surfaces 26E, 26F in the hatch, which interact with the side-orientated plane surfaces 44B, 44D, the crosscutting tool will be prevented from being able to rotate, whereby the same curved surfaces 43A, 43B come into contact again with the curved surfaces 218 of the base element 21. To a certain extent, and in certain cases totally, the rotational securement can be achieved by interaction between the upper plane surface 44C and the movable pressing appliance (not shown) belonging to the damper 30. Since the interacting surfaces between the base element 21 and the movable crosscutting tool 40 are configured with the same radius R, an exact positioning/alignment of the movable crosscutting tool will be effected. Any dirt which is loosened with the blow will be able to disappear down through the recess 217 in the base element 21, thereby further ensuring that an exact positioning/alignment can be achieved. The fixed crosscutting tool 50 is held in place during the blow by the fact that its four end faces 53A-53D, possessing the radius R, are exactly fitted in the circular recess 219 in the base element 21. From this viewpoint also, it is advantageous for precision reasons to use radiuses, since even a radius in a solid piece is relatively easy to produce with high precision, compared with other multi-dimensional shapes. A very good fit can thus be obtained between the fixed crosscutting tool 50 and the recess 219 in the base element 21, which is advantageous from both a mechanical viewpoint and from a durability viewpoint. As already stated, the axial position of the fixed crosscutting tool can easily be adjusted/altered by altering the position of the pressure screw 63 and hence of the tensioning sleeve 62 bearing against the fixed crosscutting tool 50.

Once the movable crosscutting tool 40 is back in place, a new desired length of the rod material can be inserted into the through-hole 41 in the fixed crosscutting tool 40. As a consequence hereof, the cut rod bit will be moved out of the hole 41 and will slide in the cavity 260 in the hatch 26, along the inclined plane 262A, so as then to be suitably collected.

As already described, the entire tool unit 10, 20, 30 can be quickly and easily fitted and removed, which is important for the purpose of being able to avoid disruptive operating stoppages. Another advantageous solution from a production viewpoint is that the hatch 26 can quickly and easily be picked out of the tool housing 20. This is done by pulling out each lock appliance 244, 254, whereby the hatch 26 drops down under its own weight. The height and the contours of the hatch are then matched in such a way that it can be picked out from the open space existing between it and the striking unit 10. After this, the movable crosscutting tool 40 is exposed, so that the striking tools 40, 50 can be easily picked out in the direction of the wire in the opening created by the removal of the hatch 26. The crosscutting tool 40, 50 can thus be quickly and easily inspected/exchanged. One advantage with the symmetrical shape of the crosscutting tools 40, 50 is that they can be rotated after a period of use, so that another striking surface is exposed, and also so that second edge portions interact in the cutting of the rod-shaped material. A construction according to the invention thus offers the opportunity for improved utilisation of the tool 40, 50.

The invention is not limited by the above-illustrated but can be varied within the scope of the following patent claims. It will thus be realised, for example, that the advantageous embodiment of the base element 21 can also in certain applications be utilised in connection with the use of conventional, rectangular crosscutting tools. The high thickness $T_8$ in the direction of impact gives rise to a very rigid and stable construction, at the same time as allowing compact installation of the damper 30. In this context, it is also advantageous that the thickness in the transverse direction $T_t$ is sufficiently large to withstand generated forces, yet can be made smaller than the extent in the direction of impact $T_H$, thereby allowing compact installation of the damper 30. It will further be realised that the invention, in certain contexts, can be usable in a combination of a movable, radius-possessing crosscutting tool and a fixed crosscutting tool of conventional cross-sectional configuration. It will additionally be realised that the movable tool 40 can be configured so that symmetry only exists along one plane, with the result, however, that not the same number of different types of altered positions of the striking tool 40 can be used. It will likewise be realised that the crosscutting tool 40, 50 can be configured with more than four uniform sectors. In addition, it will be realised that the base element 21 can also be configured using a plurality of non-homogenous elements, which are suitably mutually connected.

The invention claimed is:

1. A tool device for high-speed crosscutting a workpiece, comprising:

a striking unit comprising a striking piston supported and driven by a driving portion of the striking unit;

a tool housing;

a damper unit;

a movable crosscutting tool movably arranged within said tool housing;

a fixed crosscutting tool fixedly arranged within said tool housing;

said striking piston arranged to administer a force to the movable crosscutting tool;

said fixed crosscutting tool arranged to exert a detaining force upon the workpiece; and said damper unit constructed and arranged to brake the striking motion of said movable crosscutting tool;

wherein the tool housing has at least two supporting surfaces for positioning said movable crosscutting tool, said supporting surfaces being curved and having a same radius, wherein a piston access recess is constructed and arranged between said curved supporting surfaces to provide a space through which said striking piston moves, and wherein said movable crosscutting tool has curved edge surfaces in contact with said curved supporting surfaces of said tool housing, said curved edge surfaces having a substantially similar radius as said curved supporting surfaces to assist in alignment of said tool device.

2. The tool device according to claim 1, wherein the tool housing is further provided with a cylindrical fixed tool recess having a same centre line and said same radius as said supporting surfaces, and wherein said cylindrical fixed tool recess is designed for arrangement of said fixed crosscutting tool inside said tool housing.

3. The tool device according to claim 2, wherein said cylindrical fixed tool recess is disposed in a homogenous base element belonging to said tool housing.

4. The tool device according to claim 3, wherein an axially displaceable adjusting mechanism is disposed coaxially with said cylindrical fixed tool recess for axially adjustable positioning of said fixed crosscutting tool inside said cylindrical fixed tool recess.

5. The tool device according to claim 3, wherein a supporting member for said damper unit is designed to be anchored directly to said base element.

6. The tool device according to claim 1, wherein said fixed crosscutting tool has curved edge surfaces that are fitted into a cylindrical fixed tool recess of the tool housing, said curved edge surfaces of said fixed crosscutting tool having a substantially similar radius as said cylindrical tool recess.

* * * * *